United States Patent
Shanbhag et al.

(10) Patent No.: US 12,394,043 B2
(45) Date of Patent: Aug. 19, 2025

(54) WORKFLOW MANAGEMENT FOR LABELING THE SUBJECT ANATOMY

(71) Applicant: GE Precision Healthcare LLC, Wauwatosa, WI (US)

(72) Inventors: Dattesh Shanbhag, Bangalore (IN); Deepa Anand, Bangalore (IN); Chitresh Bhushan, Niskayuna, NY (US); Arathi Sreekumari, Bangalore (IN); Soumya Ghose, Niskayuna, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 568 days.

(21) Appl. No.: 17/233,807

(22) Filed: Apr. 19, 2021

(65) Prior Publication Data
US 2022/0335597 A1    Oct. 20, 2022

(51) Int. Cl.
*G06T 7/00* (2017.01)
*G06N 20/00* (2019.01)

(52) U.S. Cl.
CPC .......... *G06T 7/0012* (2013.01); *G06N 20/00* (2019.01); *G06T 2207/10081* (2013.01); *G06T 2207/10088* (2013.01); *G06T 2207/10104* (2013.01); *G06T 2207/10108* (2013.01); *G06T 2207/10116* (2013.01)

(58) Field of Classification Search
CPC .... G06V 10/82; G06V 10/70; G06V 10/7715; G06F 18/00
See application file for complete search history.

(56) References Cited

U.S. PATENT DOCUMENTS

| | | | |
|---|---|---|---|
| 9,763,635 B2* | 9/2017 | Hladuvka | A61B 6/5217 |
| 2013/0136322 A1* | 5/2013 | Zhan | G06T 7/73 |
| | | | 382/128 |
| 2016/0092748 A1* | 3/2016 | Koktava | G06T 7/0012 |
| | | | 382/128 |
| 2018/0061077 A1* | 3/2018 | Grimm | G06T 15/08 |
| 2020/0037962 A1* | 2/2020 | Shanbhag | A61B 5/055 |

(Continued)

OTHER PUBLICATIONS

Danaei, "Automatic Localization and Labelling of Spine Vertebrae in MR Images using Deep Learning," A Thesis Submitted in Partial Fulfillment of the Requirements for the Degree of Master of Applied Science in The Faculty of Graduate and Postdoctoral Studies (Biomedical Engineering), The University of British Columbia, (Vancouver), Apr. 2020, 78 pages.

(Continued)

*Primary Examiner* — Ross Varndell
(74) *Attorney, Agent, or Firm* — Fletcher Yoder, P.C.

(57) ABSTRACT

Systems and methods for workflow management for labeling the subject anatomy are provided. The method comprises obtaining at least one localizer image of a subject anatomy using a low-resolution medical imaging device. The method further comprises labeling at least one anatomical point within the at least one localizer image. The method further comprises extracting using a machine learning module a mask of the at least one localizer image comprising the at least one anatomical point label. The method further comprises using the mask to label at least one anatomical point on a high-resolution image of the subject anatomy based on the at least one anatomical point within the localizer image.

21 Claims, 5 Drawing Sheets

(56) References Cited

U.S. PATENT DOCUMENTS

2020/0097389 A1* 3/2020 Smith ................ G06F 11/0793
2020/0202515 A1 6/2020 Prasad

OTHER PUBLICATIONS

Zhan et al, "Robust MR Spine Detection Using Hierarchical Learning and Local Articulated Model", MICCAI 2012, Part I, LNCS 7510, pp. 141-148, 2012, 8 pages.

Zhang et al., "Vertebrae Detection Algorithm in CT Scout Images," Jul. 2016 DOI:10.1007/978-981-10-2260-9_26, Conference: Chinese Conference on Image and Graphics Technologies, 9 pages.

* cited by examiner

WORKFLOW MANAGEMENT FOR LABELING THE SUBJECT ANATOMY

FIELD OF THE INVENTION

This disclosure relates generally to improved medical imaging systems and methods, and more particularly to systems and methods for improved workflow management for labeling of the subject anatomy.

BACKGROUND OF THE INVENTION

Various medical imaging systems and methods are usedre to obtain images of the subject anatomy for diagnosing the medical condition. Magnetic resonance imaging (MRI) is a known medical imaging modality for imaging different body parts and provides detailed images of soft tissues, abnormal tissues such as tumors, and other structures.

Entire workflow of MRI scanning of a subject body may take anywhere between fifteen to ninety minutes of time depending on the portion of the subject body imaged. Obtaining a high-resolution MR image requires using a high-resolution MRI device. Further, accurately labeling the portions within the MR image of the subject anatomy is a manual and time-consuming process. Any error in manual labeling of the MR image may necessitate relabeling of the image and this further delays the anatomy labeling.

Typical MR imaging workflow may include obtaining several primary high-resolution images of the subject anatomy using the MRI scanner for primary assessment of the subject anatomy and obtaining a final high-resolution MR image based on the primary assessment of the anatomy. The primary MR images of the subject need manual identification and labeling of the subject anatomy and this process is inconvenient due to several reasons. Some of the reasons for inconvenience may include time required to manually label the subject anatomy and error on part of the operator in labeling the anatomy. Other important reason for inconvenience is use of the image segmentation techniques to divide the image in several parts and labeling each part individually. Therefore, the traditional MR imaging workflows are time consuming, operator centric and based on segmentation technique.

Artificial intelligence-based machine learning modules are used to automatically segment, identify and label the anatomical regions within the subject body to reduce the amount of time required for labeling activity. Artificial intelligence (AI) based machine learning techniques employing representation learning methods that allows a machine to be given raw data and determine the representations needed for data classification. Machine learning ascertains structure in data sets using backpropagation algorithms. Machine learning may utilize a variety of multilayer architectures and algorithms. Further, the machine learning (ML) modules may be trained on a set of expert classified data and used to identify the features within the target dataset. ML modules may further label the target data sets and accuracy of labeling the target data set determines accuracy of training the ML modules. In traditional MR imaging, the ML modules are trained using the primary high-resolution images obtained for primary assessment of the anatomy, however, it is not very cost effective to train the machine learning modules using the machine learning modules.

What is required is an improved workflow for processing the medical images with reduced time for identifying and labeling the subject anatomy, and that does not require obtaining the high-resolution images for primary assessment of the anatomy and segmentation techniques.

SUMMARY OF THE INVENTION

This summary introduces concepts that are described in more detail in the detailed description. It should not be used to identify essential features of the claimed subject matter, nor to limit the scope of the claimed subject matter. Its sole purpose is to present concepts in a simplified form as a prelude to the more detailed description that is presented later.

In accordance with an aspect of the disclosure a method is disclosed. The method comprises obtaining at least one localizer image of a subject anatomy using a low-resolution medical imaging device. The method further comprises labeling at least one anatomical point within the at least one localizer image. The method further comprises extracting using a machine learning module a mask of the at least one localizer image comprising the at least one anatomical point label. The method further comprises using the mask to label at least one anatomical point on a high-resolution image of the subject anatomy based on the at least one anatomical point within the localizer image.

In accordance with an aspect of the disclosure a method for automated spine labeling is disclosed. The method comprises obtaining at least one localizer image of a subject spine using a low-resolution medical imaging device. The method further comprises labeling at least one anatomical point within the at least one localizer image of the subject spine. The method further comprises extracting using a machine learning module a mask of the at least one localizer image of the subject spine comprising the at least one anatomical point label. The method further comprises using the mask to label at least one anatomical point of a high-resolution image of the subject spine based on the at least one anatomical point within the localizer image of the subject spine.

In accordance with an aspect of the disclosure a system is disclosed. The system comprises a low-resolution medical imaging device configured to obtain at least one localizer image of a subject anatomy. The system further comprises a computer processor configured to receive the at least one localizer image from the low-resolution medical imaging device. The computer processor is further configured to label at least one anatomical point within the at least one localizer image. The computer processor is further configured to extract using a machine learning module a mask of the at least one localizer image containing the at least one anatomical point label. The computer processor is further configured to use the mask to label at least one anatomical point on a high-resolution image of the subject anatomy based on the at least one anatomical point within the localizer image.

DETAILED DESCRIPTION

Figure 1:
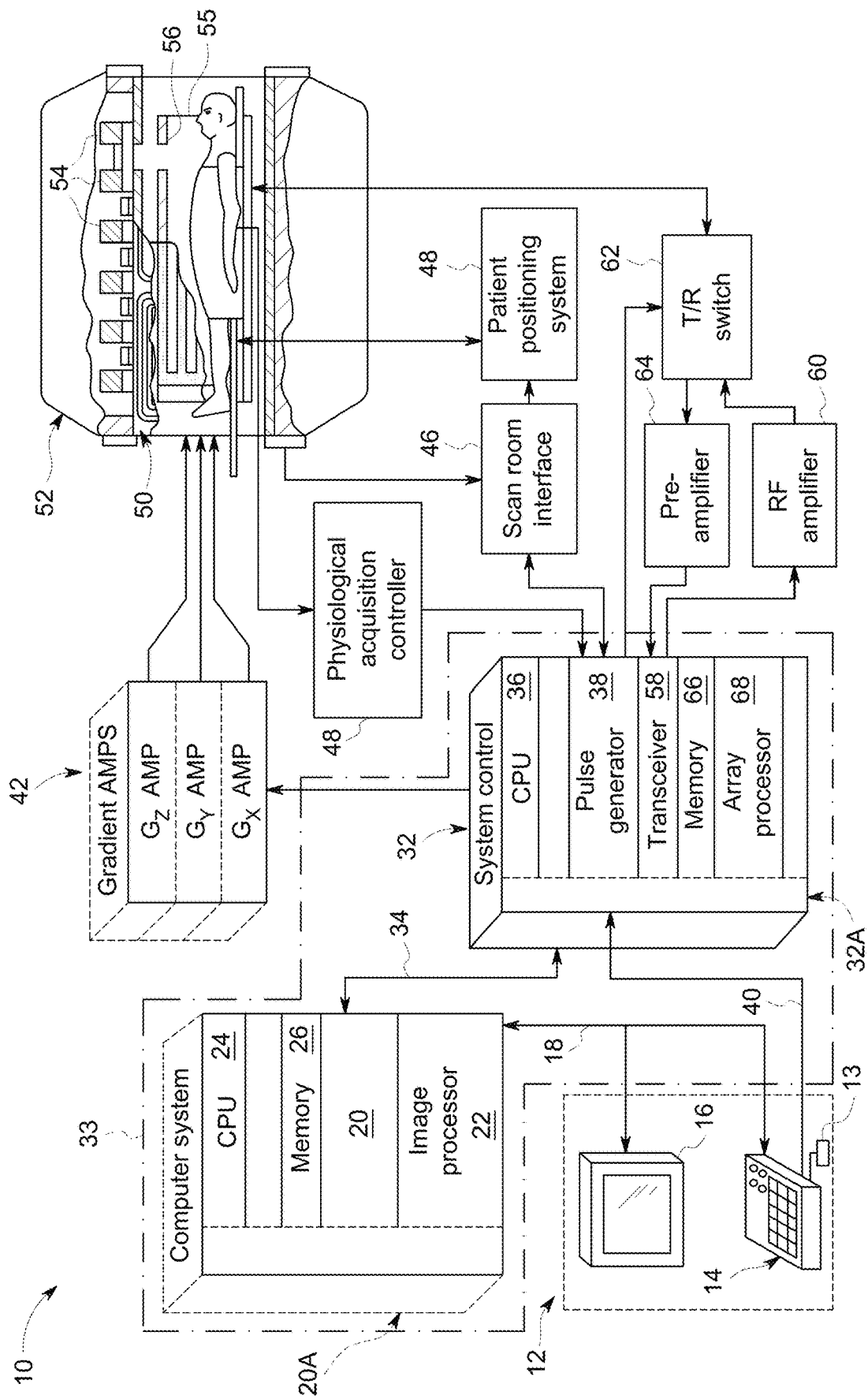
FIG. 1 illustrates a schematic diagram of a magnetic resonance imaging (MRI) system according to an aspect of the disclosure.

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable and include any computer program stored in memory for execution by devices that include, without limitation, mobile devices, clusters, personal computers, workstations, clients, and servers.

As used herein, the term "computer" and related terms, e.g., "computing device", "computer system" "processor", "controller" are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

An image contains several dots that together form the complete image. Resolution of an image is affected by number of dots present per unit distance of an image. For example, in typical camera images if the image contains three hundred or more dots per inch, the image may be considered to be of high-resolution. More than three hundred dots per inch will show all the elements of an image in greater detail. In contrast if the image contains less than three hundred dots per inch, the image is considered to be of low-resolution. However, in case of medical imaging, resolution of an image is specified in terms of specified in terms of in-plane and out plane resolution. A high-resolution image in medical imaging may be an image with in-plane resolution of less than three millimeters when the thickness of the image slice is less than six millimeters.

Although the invention is explained with respect to magnetic resonance imaging (MRI) devices and images obtained therefrom, it may be applied to the images obtained using other medical imaging devices including but not limited to computed tomography (CT) systems, X-ray systems, positron emission tomography (PET) systems, single photon emission computed tomography (SPECT) systems.

In accordance with an aspect of the disclosure a method is disclosed. The method comprises obtaining at least one localizer image of a subject anatomy using a low-resolution medical imaging device. The method further comprises labeling at least one anatomical point within the at least one localizer image. The method further comprises extracting using a machine learning module a mask of the at least one localizer image comprising the at least one anatomical point label. The method further comprises using the mask to label at least one anatomical point on a high-resolution image of the subject anatomy based on the at least one anatomical point within the localizer image.

In accordance with an aspect of the disclosure a method for automated spine labeling is disclosed. The method comprises obtaining at least one localizer image of a subject spine using a low-resolution medical imaging device. The method further comprises labeling at least one anatomical point within the at least one localizer image of the subject spine. The method further comprises extracting using a machine learning module a mask of the at least one localizer image of the subject spine comprising the at least one anatomical point label. The method further comprises using the mask to label at least one anatomical point of a high-resolution image of the subject spine based on the at least one anatomical point within the localizer image of the subject spine.

In accordance with an aspect of the disclosure a system is disclosed. The system comprises a low-resolution medical imaging device configured to obtain at least one localizer image of a subject anatomy. The system further comprises a computer processor configured to receive the at least one localizer image from the low-resolution medical imaging device. The computer processor is further configured to label at least one anatomical point within the at least one localizer image. The computer processor is further configured to extract using a machine learning module a mask of the at least one localizer image comprising the at least one anatomical point label. The computer processor is further configured to use the mask to label at least one anatomical point on a high-resolution image of the subject anatomy based on the at least one anatomical point within the localizer image.

Embodiments of the present disclosure will now be described, by way of example, with reference to the figures, in which FIG. 1 is a schematic diagram of a magnetic resonance imaging (MRI) system 10. Operation of the system is controlled from an operator console 12, which includes an input device 13, a control panel 14, and a display screen 16. The input device 13 may be a mouse, joystick, keyboard, track ball, touch activated screen, light wand, voice control, and/or other input device. The input device 13 may be used for interactive geometry prescription. The console 12 communicates through a link 18 with a computer system 20 that enables an operator to control the production and display of images on the display screen 16. The link 18 may be a wireless or wired connection. The computer system 20 may include modules that communicate with each other through a backplane 20a. The modules of the computer system 20 may include an image processor module 22, a central processing unit (CPU) module 24, and a memory module 26 that may include a frame buffer for storing image data arrays, for example. The computer system 20 may be linked to archival media devices, permanent or back-up memory storage or a network for storage of image data and programs and communicates with MRI system control 32 through a high-speed signal link 34. The programs stored on the memory of the computer system 20 may include an artificial intelligence-based machine learning module. A medical imaging workflow and devices involved in the workflow may be configured, monitored, and updated throughout operation of the medical imaging workflow and devices. One or more machine learning modules may be used to help configure, monitor, and update the medical imaging workflow and devices. Machine learning techniques, whether deep learning networks or other experiential/observational learning system, may be used to locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify features for analysis. Using a multilayered architecture, machines employing deep learning techniques may process raw data better than machines using conventional machine learning techniques. Examining data for groups of highly correlated values or distinctive themes is facilitated using different layers of evaluation or abstraction.

The MRI system control 32 may be separate from or integral with the computer system 20. The computer system 20 and the MRI system control 32 collectively form an "MRI controller" 33.

In the exemplary embodiment, computer system 20 includes a user interface that receives at least one input from a user. User interface may include a keyboard 806 that enables the user to input pertinent information. User interface may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the exemplary embodiment, computer system 20 includes a presentation interface that presents information, such as input events and/or validation results, to the user. Presentation interface may also include a display adapter that is coupled to at least one display device. More specifically, in the exemplary embodiment, display device may be a visual display device, such as a cathode ray tube (CRT), a liquid crystal display (LCD), a light-emitting diode (LED) display, and/or an "electronic ink" display. Alternatively, presentation interface may include an audio output device (e.g., an audio adapter and/or a speaker) and/or a printer.

Computer system 20 also includes a processor module 22 and a memory module 26. The processor module 22 is coupled to user interface, presentation interface and memory module 26 via a system bus. In the exemplary embodiment, processor module 26 communicates with the user, such as by prompting the user via presentation interface and/or by receiving user inputs via user interface. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory module 26 includes one or more devices that enable information, such as executable instructions and/or other data, to be stored and retrieved. Moreover, memory module 26 includes one or more computer readable media, such as, without limitation, dynamic random-access memory (DRAM), static random-access memory (SRAM), a solid state disk, and/or a hard disk. In the exemplary embodiment, memory module (26) stores, without limitation, application source code, application object code, configuration data, additional input events, application states, assertion statements, validation results, and/or any other type of data. Computer system 20, in the exemplary embodiment, may also include a communication interface that is coupled to processor module 22 via system bus. Moreover, communication interface is communicatively coupled to data acquisition devices.

In the exemplary embodiment, processor module 22 may be programmed by encoding an operation using one or more executable instructions and providing the executable instructions in memory module 26. In the exemplary embodiment, processor 814 is programmed to select a plurality of measurements that are received from data acquisition devices.

In operation, a computer system 20 executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In the exemplary embodiment, the MRI system control 32 includes a modules connected together by a backplane 32a. These modules include a CPU module 36 as well as a pulse generator module 38. The CPU module 36 connects to the operator console 12 through a data link 40. The MRI system control 32 receives commands from the operator through the data link 40 to indicate the scan sequence that is to be performed. The CPU module 36 operates the system components to carry out the desired scan sequence and produces data which indicates the timing, strength and shape of the RF pulses produced, and the timing and length of the data acquisition window. The CPU module 36 connects to components that are operated by the MRI controller 33, including the pulse generator module 38 (which controls a gradient amplifier 42, further discussed below), a physiological acquisition controller (PAC) 44, and a scan room interface circuit 46.

In one example, the CPU module 36 receives patient data from the physiological acquisition controller 44, which receives signals from sensors connected to the patient, such as ECG signals received from electrodes attached to the patient. The CPU module 36 receives, via the scan room interface circuit 46, signals from sensors associated with the condition of the patient and the magnet system. The scan room interface circuit 46 also enables the MRI controller 33 to command a patient positioning system 48 to move the patient to a desired position for scanning.

A whole-body RF coil 56 is used for transmitting the waveform towards subject anatomy. The whole body-RF coil 56 may be a body coil (as shown in FIG. 1). An RF coil may also be a local coil 57 that may be placed in more proximity to the subject anatomy than a body coil. RF coil 57 may be a surface coil. Surface coil 57 containing receiving channels may be used for receiving the signals from the subject anatomy. Typical surface coil 57 would have eight receiving channels, however, different number of channels are possible. Using the combination of both a body coil 56 and a surface coil 57 is known to provide better image quality. Using body coil 56 as a transmit coil and a receive coil may reduce the cost of the magnetic resonance (MR) system. However, the signal-to-noise ratio (hereinafter SNR) of the MR system decreases when only body coil 56 is used The pulse generator module 38 operates the gradient amplifiers 42 to achieve desired timing and shape of the gradient pulses that are produced during the scan. The gradient waveforms produced by the pulse generator module 38 are applied to the gradient amplifier system 42 having Gx, Gy, and Gz amplifiers. Each gradient amplifier excites a corresponding physical gradient coil in a gradient coil assembly 50, to produce the magnetic field gradients used for spatially encoding acquired signals. The gradient coil assembly 50 forms part of a magnet assembly 52, which also includes a polarizing magnet 54 (which, in operation, provides a longitudinal magnetic field B0 throughout a target volume 55 that is enclosed by the magnet assembly 52) and a whole-body RF coil 56 (which, in operation, provides a transverse magnetic field B1 that is generally perpendicular to B0 throughout the target volume 55). A transceiver module 58 in the MRI system control 32 produces pulses that are to be amplified by an RF amplifier 60 and coupled to the RF coil 56 by a transmit/receive switch 62. The resulting signals emitted by the excited nuclei in the subject anatomy may be sensed by the same RF coil 56 and provided to a preamplifier 64 through the transmit/receive switch 62. The amplified MR signals are demodulated, filtered, and digitized in the receiver section of the transceiver 58. The transmit/receive switch 62 is controlled by a signal from the pulse generator module 38 to electrically connect the RF amplifier 60 to the coil 56 during the transmit mode and to connect the preamplifier 64 to the coil 56 during the receive mode. The transmit/receive switch 62 may also enable a separate RF coil (for example, a surface coil) to be used in either transmit mode or receive mode.

After the RF coil 56 picks up the MR signals produced from excitation of the target, the transceiver module 58 digitizes these signals. The MR system control 32 then processes the digitized signals by Fourier transform to produce k-space data, which then transferred the processed data to a memory module 66, or other computer readable media, via the MRI system control 32. "Computer readable media" may include, for example, structures configured so that electrical, optical, or magnetic states may be fixed in a manner perceptible and reproducible by a conventional computer (e.g., text or images printed to paper or displayed on a screen, optical discs, or other optical storage media, "flash" memory, EEPROM, SDRAM, or other electrical storage media; floppy or other magnetic discs, magnetic tape, or other magnetic storage media).

A scan is complete when an array of raw k-space data has been acquired in the computer readable media 66. This raw k-space data is rearranged into separate k-space data arrays for each image to be reconstructed, and each of these k-space data arrays is input to an array processor 68, which operates to reconstruct the data into an array of image data, using a reconstruction algorithm such as a Fourier transform. This image data is conveyed through the data link 34 to the computer system 20 and stored in memory. In response to commands received from the operator console 12, this image data may be archived in a long-term storage or may be further processed by the image processor 22 and conveyed to the operator console 12 and presented on the display 16.

In certain examples, the MRI controller 33 includes an example image processing/image quality controller implemented using at least one of the CPU 24 and/or other processor of the computer system 20A and/or the CPU 36 and/or other processor of the system control 32A and/or a separate computing device in communication with the MM controller 33.

Figure 2:
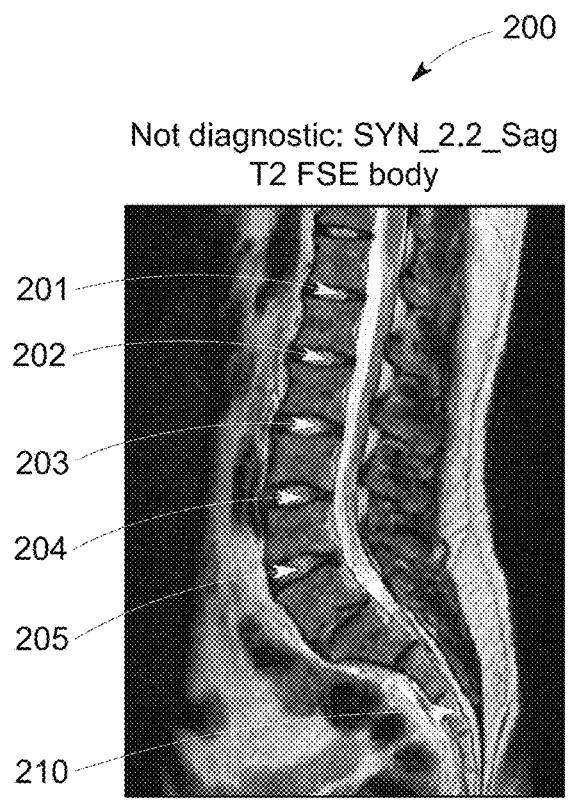
FIG. 2 illustrates a human spinal cord or spine according to an aspect of the disclosure.

In certain examples, the MRI system 10 may be used to image various portions of the subject anatomy. In one example, FIG. 2 shows a human spinal cord or spine. The MRI system 10 may be used to image the spinal cord 200 or spine of a subject. Although the further aspects of the disclosure are explained with respect of imaging the spine 200 of a subject, it is readily apparent to those skilled in the art that the disclosed systems and methods may be used to image and label other parts of the subject anatomy. The MRI system 10 may be a low-resolution scanner or a high-resolution scanner. Typical MR imaging workflow may include obtaining several primary high-resolution images of the anatomy using the MRI system 10 for primary assessment of the subject anatomy and storing the images on the memory of the computer system 20. A processor 22 may access the images stored on the computer memory and process these images to identify and label various portions of the human anatomy within the images. The MR imaging workflow may further comprise obtaining a final high-resolution MR image based on the primary assessment of the anatomy. The primary MR images of the subject need manual identification and labeling of the subject anatomy and this process is inconvenient due to several reasons. Some of the reasons for inconvenience may include time required to manually label the subject anatomy and due to the probability of operator error in labeling the anatomy. Other important reason for inconvenience is use of image segmentation techniques to divide the image in several parts and labeling each part individually. Therefore, the traditional MR imaging workflow is time consuming, operator centric and based on segmentation technique.

Human spine 200 of the present example consists of interconnected vertebrae 201, 202, 203, 204, 205 that form the central part of the human body and extends from the brainstem (not shown) to the sacrum bone 210. Although only few vertebras 201, 202, 203, 204, 205 have been shown in the current example, it is readily understood that there are more vertebrae that form the spinal cord. The spinal cord 200 or spine may be divided into three broad portions namely cervical portion that is connected to the brainstem, thoracic portion that forms thorax and lumbar portion that is connected to the sacrum bone. Imaging the spine 200 using the MRI device 10 consists of obtaining the images of the vertebras 201, 202, 203, 204, 205 and labeling the vertebras 201, 202, 203, 204, 205 according to their location within the spine images. Spine labeling is an important task in planning and reporting the spine examination reports to the clinician for diagnosing the spine 200 condition.

The existing approaches of spine labeling involve obtaining a high-resolution image of the spine 200, manually counting the vertebras 201, 202, 203, 204, 205 and inserting the labels. The vertebras 201, 202, 203, 204, 205 have similar appearance and the labeling technician may wrongly label the vertebras 201, 202, 203, 204, 205 due to similar appearance. Any error in labeling the vertebras 201, 202, 203, 204, 205 will require recounting and relabeling efforts that will delay the labeling process. Another approach to labeling the vertebras 201, 202, 203, 204, 205 includes acquiring a high resolution two-dimensional (2D) or specialized 3D image of the spine (200) and using machine learning algorithms to generate segmentation of the vertebrae. After segmentation of the vertebras 201, 202, 203, 204, 205, vertebra masks may be generated by manually labeling the vertebrae or by automatic landmark detection techniques. However, this technique requires accurate segmentation of vertebrae and labeling of the ground truth data for training the machine learning module. Therefore, the existing methods of segmenting the vertebrae 201, 202, 203, 204, 205 and using it as a training data is not only time consuming but also a processing burden.

Figure 3:
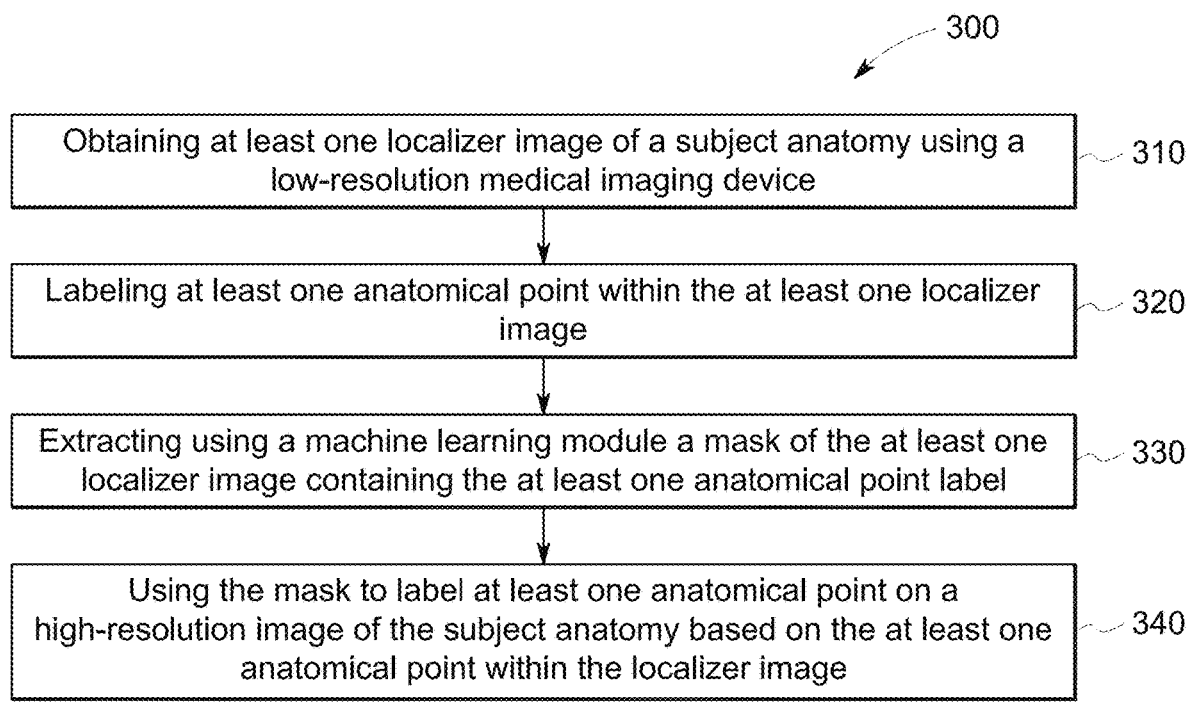
FIG. 3 illustrates a method to generate vertebrae labels from the 2D localizer images according to an aspect of the disclosure.

In accordance with an aspect of the disclosure, FIG. 3 shows a method 300 to generate vertebrae labels from the 2D localizer images. The 2D localizer images may be obtained using a low-resolution MM scanner also known as 2D three plane localizer without requiring further scanning and segmentation of the vertebrae. The method 300 comprises obtaining 310 at least one localizer 2D image of a subject spine using the low-resolution MRI device 10. The method 300 further comprises labeling 320 the vertebrae by providing location points on the image. The location point may include one or more points on the vertebrae indicative of the vertebrae location. Further, the location of the labels may be indicated by a shape such as a square, rectangle, or a circle, however, any other shape may be used to indicate the location of the labels. In one example, the points may be thoracic twelfth vertebra (T12) or a lumbar fourth vertebra (L4) or a sacral first vertebra (S1) at locations shown in FIG. 2. The labeling of one 2D image may be carried out manually or using the machine learning module stored on the computer memory and may be used to further label the images that are presented in future for labeling. According to an aspect of the disclosure, the computer processor 22 may be configured to carry out one or more of the further steps of the method 300. According to an aspect of the disclosure, the method 300 comprises extracting 330 the label points from a labeled image and storing the point locations for future labeling. Extracting (330) the label points may be carried out using a known machine learning technique such as two stacked U-Net architectures that together form WNET architecture with size-weighted dice and per-mask shape encoder. U-Net architectures are convolution neural networks used for medical image segmentaion. According to another aspect of the disclosure, extracting 330 may be carried out using a regression network to process the 2D localizer images. A machine learning module for example a localizer image quality module (LocalizerIQ) may be adapted for regression to identify the coordinates of the label points in 2D or 3D space. The method 300 further comprises labeling 340 the future high-resolution images using the point locations on the 2D localizer images stored for future labeling. Labeling 340 comprises using a machine learning module configured to use the stored point locations and apply them to identify the points on the high-resolution images.

Figure 4:
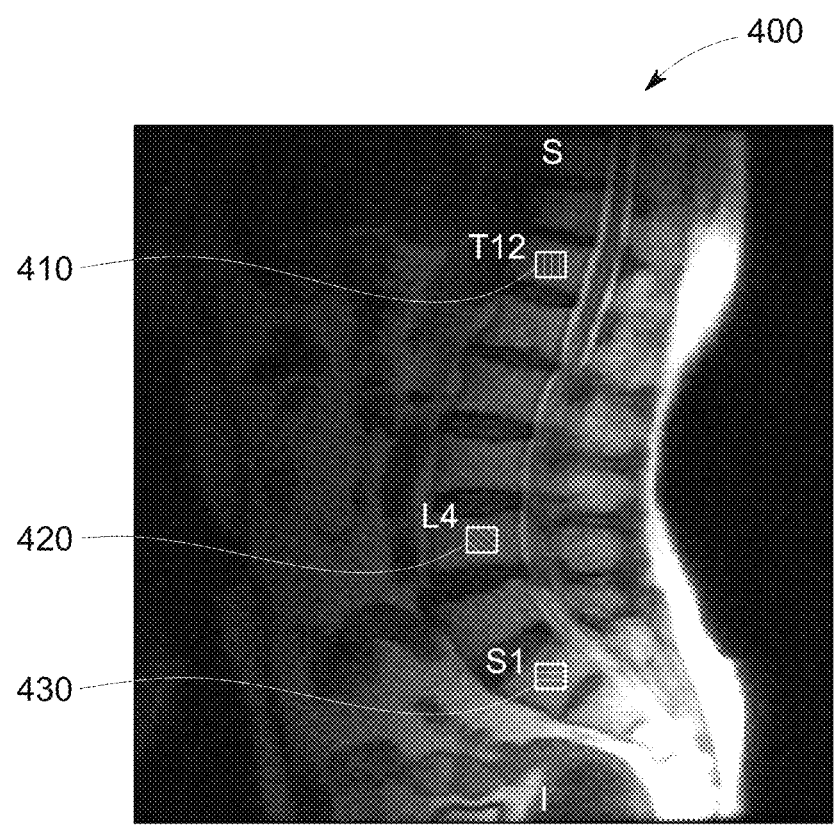
FIG. 4 illustrates point determination using the machine learning module according to an aspect of the disclosure.

According to an aspect of the disclosure, as shown in FIG. 4 the point determination 400 may be carried out using a machine learning module configured to identify and label the location of points 410, 420, 430 on a low-resolution image. The machine learning (ML) module may be stored on the computer memory and the computer processor 22 may be configured to execute the ML instructions. In one example, the points 410, 420, 430 correspond to the points T12, L4 and S1. When a high-resolution 2D or 3D spine image 400 is presented to the ML module, the ML module will locate these points 410, 420, 430 on a high-resolution image and insert the labels T12, L4 and S1 at points corresponding to location of points T12, L4 and S1 in a low-resolution image. Use of this labeling method provides an improved workflow for processing the MR images with reduced amount of time required for identifying and labeling the subject anatomy. Further, the method does not require obtaining the high-resolution images for generating labels over the anatomy and the requirement of segmentation of vertebrae may be completely eliminated to not only reduce the time but also the cost of imaging.

Figure 5:
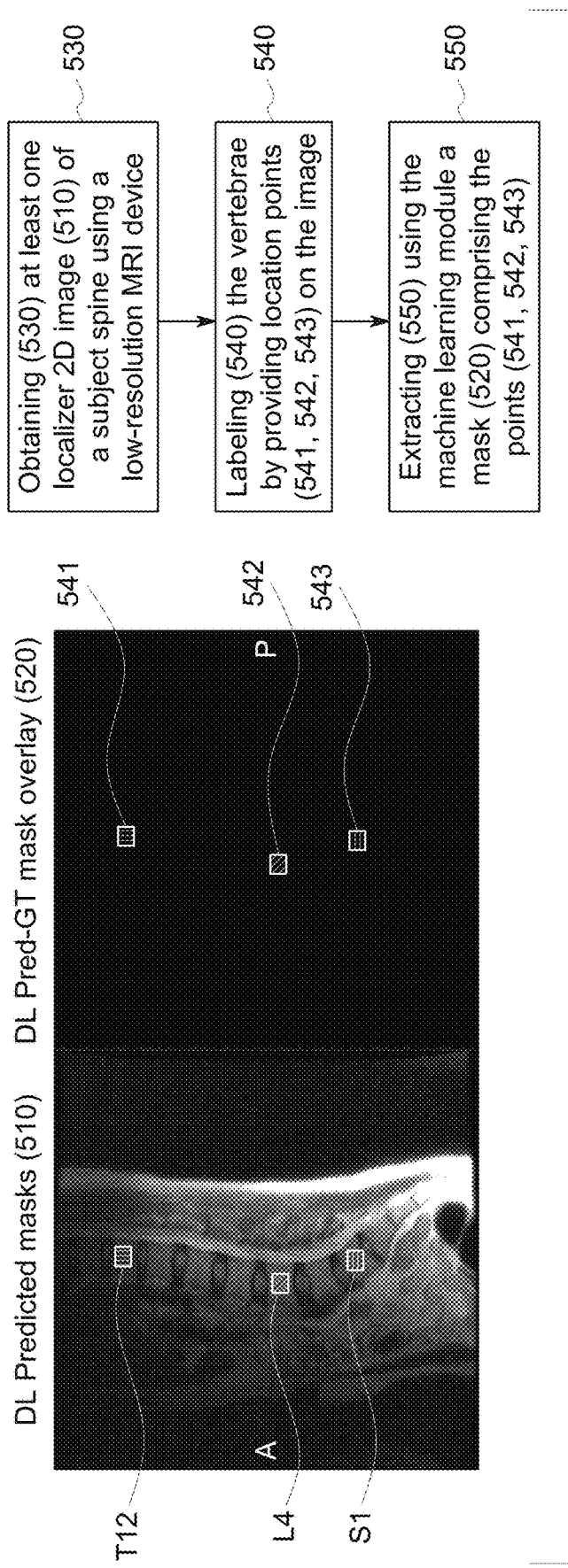
FIG. 5 illustrates a method to generate a mask overlay from the 2D spine image according to an aspect of the disclosure.

In accordance with an aspect of the disclosure, FIG. 5 shows a method 500 to generate a mask overlay 520 from the 2D spine image 510. The method 500 comprises obtaining 530 at least one localizer 2D image 510 of a subject spine using a low-resolution MRI device. The method 500 further comprises labeling 540 the vertebrae by providing location points 541, 542, 543 on the image. In one example, the location points 541, 542, 543 may be T12, L4 and S1. However, a greater number of different points may be labeled. The method 500 further comprises extracting 550 using the machine learning module a mask 520 comprising the points 541, 542, 543. The mask 520 may be overlayed on to the other images obtained from the high-resolution scanners to label the corresponding points within such other images. This method 500 may substantially reduce the time required for labeling the spine and do away with the need of segmenting the spine into several areas for labeling.

Figure 6:
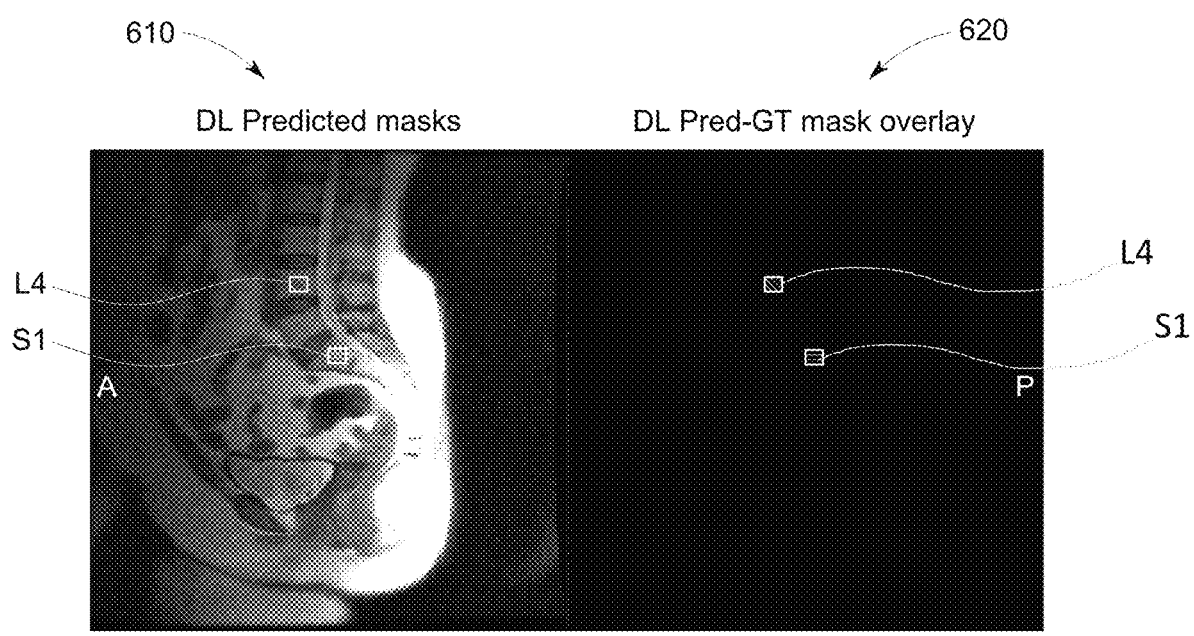
FIG. 6 illustrates estimating the error in labeling the points using the ML module according to an aspect of the disclosure.

In accordance with an aspect of the disclosure, FIG. 6 shows estimating the error in labeling the points using the ML module for lumbar spine. Points L4 and S1 of lumbar spine were labeled for fifty images 610 using the ML module and masks 620 were obtained. The masks 620 were tested for accuracy of labeling. In one example, fifty test images of lumbar spine were tested for labeling accuracy. The mean error value for L4 was about 4.5 millimeters and for S1 the mean error value was about 4.1 millimeter. As the vertebrae are about fifteen to eighteen millimeters in length and breadth, the error indicates reliable determination of the vertebrae label centers within the vertebrae. In one aspect, the error may be reduced by using a greater number of labels on the spine to create what is termed as the dense labeling. The greater number of close labels will act as closer anchor points for neighboring labels. Accordingly, any error in labeling one vertebra may be compensated by using the other vertebrae labels that are closer to the one vertebra with labeling error and a self-correcting error code may be developed to correct the errors. This method helps to quickly localize and label the vertebrae using the standard three-plane localizers and ability to incorporate and improve the existing workflow of the MR imaging. Accordingly, automation of spine labeling using the 2D localizer images may be accomplished.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
   obtaining at least one localizer image of a subject anatomy using a low-resolution medical imaging device;
   labeling at least one anatomical point within the at least one localizer image, wherein the at least one anatomical point refers to a vertebrae location point, and wherein the at least one anatomical point within the at least one localizer image is labeled without the at least one anatomical point having been segmented;
   extracting using a machine learning module a mask of a portion of the at least one localizer image comprising the at least one anatomical point that is labeled, wherein extracting the mask further comprises identifying spatial coordinates of the at least one anatomical point that is labeled;
   identifying at least one corresponding anatomical point on a high-resolution image of the subject anatomy based on the spatial coordinates of the at least one anatomical point that is labeled; and
   overlaying the mask on the at least one corresponding anatomical point to label the at least one corresponding anatomical point on the high-resolution image of the subject anatomy, wherein the at least one localizer image has a lower resolution than the high-resolution image.

2. The method of claim 1, wherein obtaining at least one localizer image of the subject anatomy using the low-resolution medical imaging device comprises obtaining a two-dimensional (2D) or a three-dimensional (3D) image of the subject anatomy.

3. The method of claim 1, wherein labeling the at least one anatomical point within the localizer image comprises manual labeling or automated labeling using the machine learning module.

4. The method of claim 1, wherein labeling the at least one anatomical point within the localizer image comprises identifying the at least one anatomical point within the localizer image and inserting a shape indicative of location of the label at the anatomical point.

5. The method of claim 1, wherein extracting using a machine learning module the mask of the portion of the localizer image containing the at least one anatomical point that is labeled comprises using a localizerIQ module containing a regression network to locate the at least one anatomical point.

6. The method of claim 1, further comprising densely labeling the at least one localizer image of the subject anatomy and using a self-correcting error code to automatically correct location of the at least one anatomical point within the localizer image.

7. The method of claim 1, wherein the subject anatomy is a human spinal cord or spine and labeling at least one anatomical point within the localizer image comprises labeling at least one vertebra within the spine.

8. The method of claim 7, wherein the at least one anatomical point within the localizer image comprises at least one anatomical point in a thoracic portion or a lumbar portion or a sacral portion within the spine.

9. The method of claim 1, wherein the low-resolution medical imaging device comprises a magnetic resonance imaging (MRI) device, an ultrasound device, a computed tomography (CT) systems, an X-ray system, a positron emission tomography (PET) system, a single photon emission computed tomography (SPECT) system.

10. The method of claim 1, further wherein any error in labeling the at least one anatomical point on the high-resolution image is compensated by using other anatomical points that are closer to the corresponding anatomical points in the at least one localizer image.

11. The method of claim 1, further comprising estimating an error in labeling the at least one anatomical point within the localizer image using the machine learning module.

12. A method for automated spin labeling, the method comprising:
    obtaining at least one localizer image of a subject spine using a low-resolution medical imaging device;
    labeling at least one anatomical point within the at least one localizer image of the subject spine, wherein the at least one anatomical point refers to a vertebrae location point, and wherein the at least one anatomical point within the at least one localizer image is labeled without the at least one anatomical point having been segmented;
    extracting using a machine learning module a mask of a portion of the at least one localizer image of the subject spine comprising the at least one anatomical point that is labeled, wherein extracting the mask further comprises identifying spatial coordinates of the at least one anatomical point that is labeled;
    identifying at least one corresponding anatomical point on a high-resolution image of the subject spine based on the spatial coordinates of the at least one anatomical point that is labeled; and
    overlaying the mask on the at least one corresponding anatomical point to label the at least one corresponding anatomical point on the high-resolution image of the subject spine, wherein the at least one localizer image has a lower resolution than the high-resolution image.

13. The method of claim 12, wherein the at least one anatomical point within the localizer image comprises at least one anatomical point in a thoracic portion or a lumbar portion or a sacral portion within the spine.

14. The method of claim 12, wherein obtaining the at least one localizer image of the subject spine using a low-resolution medical imaging device comprises obtaining a two-dimensional (2D) or a three-dimensional (3D) image of the spine.

15. The method of claim 12, wherein labeling the at least one anatomical point within the localizer image of the subject spine comprises manual labeling or automated labeling using the machine learning module.

16. The method of claim 15, wherein the labeling at least one anatomical point within the localizer image of the subject spine comprises inserting the spine labels in a thoracic portion or lumbar portion or sacral portion within the spine.

17. The method of claim 12, further comprising densely labeling the at least one localizer image of the spine and using a self-correcting error code to automatically correct location of the at least one anatomical point within the localizer image.

18. A system comprising:
  a low-resolution medical imaging device configured to obtain at least one localizer image of a subject anatomy; and
  a computer processor configured to receive the at least one localizer image from the low-resolution medical imaging device, wherein the computer processor is further configured to:
    label at least one anatomical point within the at least one localizer image, wherein the at least one anatomical point refers to a vertebrae location point, and wherein the at least one anatomical point within the at least one localizer image is labeled without the at least one anatomical point having been segmented;
    extract using a machine learning module a mask of a portion of the at least one localizer image containing the at least one anatomical point that is labeled, wherein extracting the mask further comprises identifying spatial coordinates of the at least one anatomical point that is labeled;
    identify at least one corresponding anatomical point on a high-resolution image of the subject anatomy based on the spatial coordinates of the at least one anatomical point that is labeled; and
    overlay the mask on the at least one corresponding anatomical point to label the at least one corresponding anatomical point on the high-resolution image of the subject anatomy, wherein the at least one localizer image has a lower resolution than the high-resolution image.

19. The system of claim 18, wherein the at least one localizer image of a subject anatomy comprises a two-dimensional (2D) or a three-dimensional (3D) image of the subject anatomy.

20. The system of claim 18, wherein labeling the at least one anatomical point within the localizer image comprises manual labeling or automated labeling using a machine learning module.

21. The system of claim 18, wherein the computer processor is further configured to densely label the at least one localizer image of the subject anatomy and use a self-correcting error code to automatically correct location of the at least one anatomical point within the localizer image.

* * * * *